United States Patent [19]
Chottiner

[11] 3,877,994
[45] Apr. 15, 1975

[54] CATALYTIC PASTE AND ELECTRODE

[75] Inventor: Jacob Chottiner, McKeesport, Pa.

[73] Assignee: Westinghouse Electric Corporation, Pittsburgh, Pa.

[22] Filed: Oct. 25, 1972

[21] Appl. No.: 300,618

[52] U.S. Cl. .............................................. 136/121
[51] Int. Cl. ........................................... H01m 13/02
[58] Field of Search............ 136/120 FC, 121, 86 D, 136/86 DD

[56] References Cited
UNITED STATES PATENTS

| | | | |
|---|---|---|---|
| 1,951,814 | 3/1934 | Weldes | 136/121 X |
| 3,077,507 | 2/1963 | Kordesch et al. | 136/120 X |
| 3,318,736 | 5/1967 | Barber | 136/120 X |
| 3,348,975 | 10/1967 | Ziering | 136/120 |
| 3,385,736 | 5/1968 | Deibert | 136/120 |
| 3,388,004 | 6/1968 | Rosenblatt | 136/120 |
| 3,527,616 | 9/1970 | Landi | 136/120 X |
| 3,553,029 | 1/1971 | Kordesch et al. | 136/121 X |
| 3,600,230 | 8/1971 | Stachurski et al. | 136/120 X |
| 3,671,323 | 6/1972 | Sandler | 136/120 X |
| 3,704,171 | 11/1972 | Landi | 136/120 X |

*Primary Examiner*—Daniel E. Wyman
*Assistant Examiner*—Thomas A. Waltz
*Attorney, Agent, or Firm*—R. D. Fuerle

[57] ABSTRACT

A catalytic paste is disclosed which contains 3 to 55% finely-divided carbon, 2 to 10% binder, 0.4 to 6% catalyst, 30 to 70% water, and 0.01 to 3% water-soluble alkali-resistant thickener which, in a 2% aqueous solution, has a viscosity of at least 100 centipoises. The thickener is preferably a non-ionic cellulosic ether. A conducting plaque is filled with the catalytic paste to form an electrode.

19 Claims, 1 Drawing Figure

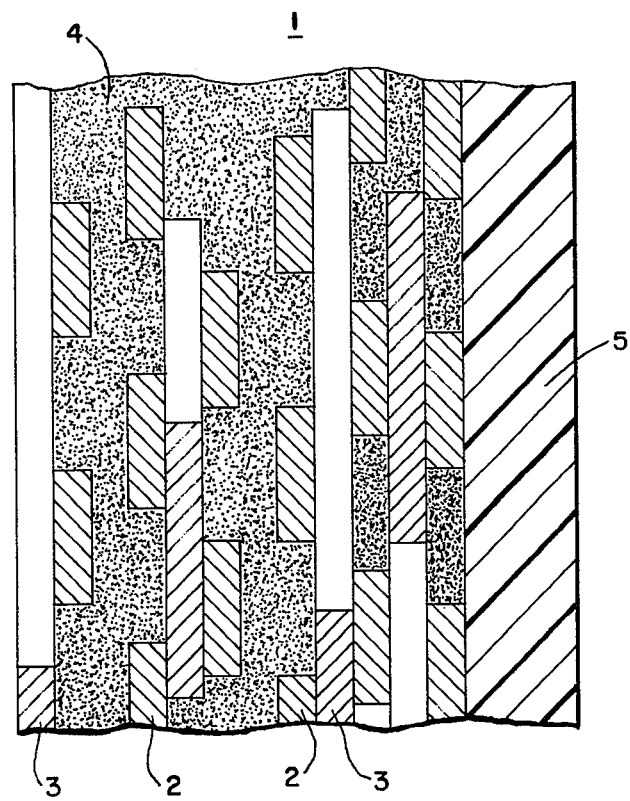

CATALYTIC PASTE AND ELECTRODE

BACKGROUND OF THE INVENTION

An air electrode provides a gas-electrolyte interface where oxygen in air interacts with a liquid electrolyte to generate a current. The electrode is made by working a catalytic paste into a porous, conducting plaque.

A great deal of time, typically an hour to an hour-and-a-half, is required to work the paste into a plaque, about 1 square foot in area, and it must be done by hand. This is because water is forced out of the paste as it is pressed against the plaque, and the paste does not flow readily into the pores of the plaque and becomes more difficult to spread over the area of the plaque. The excessive and forceful working required frequently breaks fibers in the plaque and produces a non-uniform paste distribution.

SUMMARY OF THE INVENTION

I have found that an improved catalytic paste can be made by including about 0.01 to about 3% of a water-soluble, alkali-resistant thickener in the paste. My paste flows so much more readily into the plaque that it is now possible to work the paste into the plaque with automated equipment, thus saving a great deal of expensive labor. It can be worked in in about 15 minutes by hand and less than a minute with an automatic blade. The improved paste does not break the fibers of the plaque and the paste can be uniformly distributed over the plaque. Water is not readily forced out of the paste under the pressure necessary to work it into the plaque.

While the object of including the thickener in the paste was to overcome the above-recited problems, in addition, my paste quite unexpectedly produced an electrode with improved polarization characteristics. Polarization is a measure of the ability of the electrode to maintain a constant voltage under varying current densities. It is probably the most important indicator of the effectiveness of an electrode.

The electrode can be used in a fuel cell or various other applications, but is most suited for use as an air electrode in an iron-air battery.

DESCRIPTION OF THE INVENTION

The accompanying drawing is a sectional side view of a certain presently preferred air electrode according to this invention.

In the drawing a porous, conducting plaque 1 has layers of fibers 2 laid at an angle to alternating layers of fibers 3. The plaque is filled with catalytic paste 4. A porous hydrophobic membrane 5 is bonded to the air side of the electrode.

THE PASTE

The catalytic paste of this invention comprises about 3 to about 55% of a substantially all-carbon material, about 2 to about 10% of a binder, about 0.6 to about 4% of a catalyst, about 30 to about 70% water, and about 0.01 to about 3% of a water-soluble, alkali-resistant thickener.

The carbon material acts as a conductor in the paste and aids in catalyzing the electrochemical reaction. It should be finely divided and have an average particle size of less than about $7\mu m$ (microns) and preferably less than $0.5\mu m$, and have a high surface area. Activated carbon is preferred, but graphite and other materials could also be used.

The binder helps to hold the paste together. The preferred binder is polytetrafluoroethylene because it fibrillates under shear to produce a fibrous network structure which very effectively binds the paste together. It is also hydrophobic and imparts the proper balance between hydrophobicity and hydrophillicity in the catalytic layer. Polypropylene, paraffin, and fluorinated polymers such as fluorinated ethylene-propylene could also be used. The binder particles preferably are less than about $1\mu m$ in size although they could be as large as about $40\mu m$.

The catalyst catalyzes the electrolytic reaction and is preferably soluble so that it can be homogeneously distributed throughout the paste. Platinum and the oxides of calcium, manganese, and iron can be used as catalysts, but the preferred catalyst, which produces the greatest polarization and longest electrode life at a reasonable cost, is a mixture of soluble mercury and silver salts in a mole ratio of about 0.1 to 1 to about 1 to 1. The preferred mercury salt is mercuric acetate and the preferred silver salt is silver nitrate but mercury oxalate, nitrate, or other salts could also be used. Up to about 40% of a metallic oxide secondary catalyst such as manganese dioxide may also be included in the composition.

Water used is preferably deionized in order to avoid contamination of the paste.

The thickener is water-soluble and is sufficiently resistant to alkali (i.e. 35% NaOH) so that it does not form products which poison the electrolyte. A suitable thickener is one which, is a 2% aqueous solution, produces a viscosity of at least 100 centipoises but preferably greater than 1000 cps. The thickener is preferably non-ionic to prevent interference with the electrochemical reaction. The preferred thickeners are cellulosic ethers such as methyl cellulose, hydroxyethyl cellulose, hydroxypropyl cellulose, hydroxypropylmethyl cellulose, hydroxybutylmethyl cellulose, etc. Hydroxypropyl cellulose seems to produce electrodes with the best life and polarization properties. Other suitable thickeners include carboxy vinyl polymers of extremely high molecular weight; they function about as well as the cellulose ethers. Preferably, for the greatest polarization, the amount of thickener in the paste is about 0.05 to about 0.6%.

The paste may also contain up to about 1% of a wetting agent in order to reduce the amount of water in the paste. However, inclusion of a wetting agent is not preferred as it could contaminate the electrolyte.

THE PLAQUE

The plaque may be wire mesh, expanded or perforated sheet, compressed metallic wool, etc. However, for a flexible electrode the plaque is preferably made up of diffusion-bonded fibers which are preferably nickel (including nickel-coated iron) as nickel resists corrosion, but other metal fibers such as copper, silver, cadmium, or various alloys could also be used.

A diffusion-bonded plaque can be made by shredding foil to produce fibers about ½ to about 5 mils thick and about 4 to 10 inches long, or as long as the shredder can make them. The fibers are laid approximately unidirectionally to form a layer and another layer is placed on top of the first layer with the fibers in it at about 30° to 90° to the fibers in the first layer. Succeeding layers are laid each at about 30° to 90° to the adjacent layers until 2 to about 100 have been laid. Preferably about 15 to 25 layers are used since a plaque having less than 15 layers does not have enough conductive paths, is too weak, and does not provide enough anchorage for the paste. If more than 25 layers are used it is difficult to completely fill the plaque with paste. After all the layers have been laid the fibers are diffusion-bonded to form a flexible plaque. Diffusion bonding is done by heating the fibers just below their melting point causing the atoms to diffuse across the points of contact.

The plaque should preferably have a porosity of about 30 to about 40%, which means that its bulk density should preferably be about 60 to about 70% of the density of the fibers. A typical plaque may measure about 1 to 30 inches by about 1 to 30 inches and be about 5 to 50 mils thick.

The plaque is preferably covered on the air side with a porous hydrophobic membrane which permits oxygen to pass into the plaque but prevents the electrolyte from leaving the plaque. It is preferably about 5 to about 40 mils thick. The pore size should be the largest size which will hold the electrolyte in, preferably abut 0.003 to about 100 microns. The preferred membrane is polypropylenereinforced, fibrillated polytetrafluoroethylene because it has the best combination of air permeability and hydrophobicity. 100% polytetrafluoroethylene or combinations of polyolefins such as polypropylene and polyethylene can also be used. The membrane can be omitted if one side of the plaque is made more hydrophobic, as by coating it with polytetrafluoroethylene particles.

MAKING THE ELECTRODE

The paste is deposited in front of an oblique knife blade which moves across the plaque forcing the paste into the plaque. The plaque is air dryed for about an hour to remove some water which prevents paste from sticking to surfaces contacted when the other side is pasted. The plaque is turned over and paste is forced into the other side in the same way. The plaque is air dried overnight at room temperature to remove most of the water and is then pressed at about 225° to 300°C and about ½ to 4 tons sq. in. The membrane is placed over one side and pressed at about 90° to 200°C and about 170 to 375 lbs/linear inch using laminating rolls. The electrode is mounted on a frame and put in a cell for use.

EXAMPLES

The following examples illustrate the preparation of the paste and the testing of electrode according to this invention.

Dry blends were made of 2.0 gms manganese dioxide, various amounts of various thickeners, and 1 gm of activated carbon, (particle size = 1 to 20 microns with average particle size = about 10 microns), 0.75 gms of which had a surface area of 750 $m^2$/gm and 0.25 gm of which had a surface area of 600 $m^2$/gm. Into 4.5 gms deionized water were dissolved 0.075 gms silver nitrate and 0.075 gms mercuric acetate. The solution and the dry blend were mixed together for approximately one minute, then 16 drops of a 60% suspension of 0.05-0.5 micron particle-sized polytetrafluoroethylene (sold by Dupont under the trademark "Teflon 30B") was mixed in. Each paste was allowed to sit overnight to allow the thickener to take effect.

Plaques 3¾ by 3¼ inches and 45 mils thick with an overall density of about 5.8, made with diffusion-bonded, nickel-coated iron fibers (65% nickel) were each filled with approximately 7.00 gms of paste. Half the amount of paste was applied to one side with a spatula. The plaque was dried for one-half hour, then the remaining paste was applied to the other side. The plaque was dried overnight then pressed at 275°C for 10 minutes with an aluminum foil release sheet at 18 tons total pressure.

Membranes of polypropylene-reinforced fibrillated polytetrafluoroethylene were roll laminated at 190°C and 300 lbs./linear inch of pressure onto one side of the plaque. The electrode was mounted in an ABS plastic frame and assembled as a half-cell for testing using an electrolyte of 35% KOH.

The life of the half-cells was determined by passing 50 ma/$cm^2$ through the cell until the voltage declined to 200 mv below Hg/HgO. The polarization characteristics of the half-cells were determined by stepwise incrementing then decrementing the current density passing through the half-cell and measuring the voltage (mv) against a Hg/HgO electrode at each step. The following table gives the results. All values for mv are negative (i.e., potentials below Hg/HgO).

POLARIZATION

| Thickener | Life (hours) | (mv vs. Hg/HgO at current densities indicated) | | | | | | | | | |
|---|---|---|---|---|---|---|---|---|---|---|---|
| | | 10 | 25 | 50 | 75 | 100 | 150 | 100 | 75 | 50 | 150-50 |
| None | 511 | 57 | 89 | 122 | 158 | 209 | 301 | 196 | 141 | 105 | 179 |
| None | 391 | 45 | 65 | 86 | 105 | 133 | 206 | 136 | 103 | 81 | 120 |
| None | 341 | 44 | 64 | 85 | 109 | 140 | 195 | 137 | 109 | 84 | 110 |
| None | 391 | 43 | 81 | 110 | 135 | 169 | 255 | 158 | 126 | 101 | 145 |
| 0.6% Methylcellulose(1) | 528 | 59 | 86 | 109 | 125 | 140 | 168 | 137 | 122 | 106 | 59 |
| " | 415 | 59 | 83 | 104 | 119 | 133 | 163 | 132 | 118 | 103 | 59 |
| " | 528 | 58 | 79 | 98 | 111 | 123 | 149 | 123 | 110 | 98 | 51 |
| " | 511 | 56 | 75 | 92 | 103 | 114 | 136 | 114 | 102 | 91 | 44 |
| 0.6% methylcellulose(2) | 458 | 55 | 77 | 97 | 113 | 127 | 154 | | | | 57 |
| 0.3% " | 76* | 28 | 44 | 58 | 70 | 81 | 103 | | | | 45 |
| " " | 892 | 39 | 64 | 88 | 107 | 123 | 157 | | | | 69 |
| 0.6% hydroxypropyl methylcellulose(3) | 522 | 55 | 75 | 93 | 107 | 119 | 142 | | | | 49 |
| 0.3% " | 700 | 34 | 56 | 76 | 91 | 104 | 134 | | | | 58 |
| " " | 92* | 42 | 63 | 86 | 107 | 111 | 133 | | | | 47 |

POLARIZATION — Continued

| Thickener | Life (hours) | \(mv vs. Hg/HgO at current densities indicated\) | | | | | | | | | |
|---|---|---|---|---|---|---|---|---|---|---|---|
| | | 10 | 25 | 50 | 75 | 100 | 150 | 100 | 75 | 50 | 150-50 |
| 0.6% hydroxybutyl methylcellulose(4) | 458 | 60 | 87 | 114 | 136 | 156 | 192 | | | | 78 |
| 0.3% " | 741 | 34 | 63 | 90 | 113 | 141 | 181 | | | | 91 |
| " " | 892 | 41 | 63 | 85 | 103 | 120 | 164 | | | | 79 |
| 0.6% hydroxypropyl cellulose(5) | 651 | 59 | 79 | 96 | 108 | 119 | 137 | 118 | 107 | 95 | 41 |
| " " | 631 | 57 | 77 | 93 | 104 | 114 | 131 | 114 | 103 | 91 | 38 |
| 0.3% " | 1043 | 53 | 73 | 91 | 104 | 115 | 137 | | | | 46 |
| " " | 1331 | 52 | 72 | 89 | 102 | 114 | 134 | | | | 45 |
| 0.1% " | 730 | 39 | 59 | 76 | 88 | 99 | 119 | | | | 43 |
| " " | 978 | 44 | 70 | 96 | 119 | 140 | 184 | | | | 88 |
| 0.05% " | 337 | 49 | 78 | 109 | 137 | 165 | 226 | | | | 117 |
| " " | 313 | 47 | 75 | 103 | 129 | 156 | 314 | | | | 111 |
| 0.1% carboxy vinyl polymer (6) | 850 | 41 | 67 | 103 | 128 | 148 | 184 | | | | 81 |

*Failure due to leaking cell.

(1), (2), (3) and (4) sold by Dow Chemical Co. under the trademark "Methocel" and the designations "MC 4000," "MC 8000," "HG65," and "HB" respectively. The viscosity in a 2% aqueous solution at 20°C of (1) is 4000 centipoises and of (2) is 8000 centipoises.

(5) — sold by Hercules, Inc. under the trademark "Klucel H." It has a viscosity of 1500–2500 centipoises in a 1% aqueous solution at 25°C. and an average molecular weight of about 1,000,000.

(6) — sold by B. F. Goodrich Chemical Co. under the trademark "Carbopol 940" (neutralized to pH = 7.0 with NaOH before use).

In the above table the 150-50 column is the potential in reference to Hg/HgO obtained at 150 ma/cm$^2$ minus the potential obtained at the first 50 ma/cm$^2$. The 150-50 column shows that the half-cells which contained no thickener had voltages at 150 ma/cm$^2$ which were much greater than the voltage at 50 ma/cm$^2$, while in the cells which contained thickeners this difference was much smaller. This indicates that less power will be wasted as heat in the electrode at high current drains. The life of the cells which contained a thickener was in many cases superior to the control cells.

I claim:

1. A catalytic paste comprising:
   1. about 3 to about 55% of a substantially elemental carbon material having an average particle size of less than about 25 microns;
   2. about 2 to about 10% of a hydrophobic binder;
   3. about 0.6 to about 4% of a catalyst;
   4. about 30 to about 70% water; and
   5. about 0.01 to about 3% of a non-ionic, water-soluble thickener, said thickener being sufficiently resistant to alkali so that it does not form products which poison the electrolyte, and, which, in a 2% aqueous solution, produces a viscosity of at least 100 centipoises, said thickener producing an improved polarization over a composition therewithout.

2. A catalytic paste according to claim 1 wherein said all-carbon material is activated carbon.

3. A catalytic paste according to claim 2 wherein said activated carbon has a particle size of less than about 0.5μm.

4. A catalytic paste according to claim 1 wherein said binder is polytetrafluoroethylene.

5. A catalytic paste according to claim 1 wherein said catalyst is soluble mercury and silver salts in a mole ration of about 0.1 to 1 to about 1 to 1.

6. A catalytic paste according to claim 1 wherein said thickener is a cellulosic ether.

7. A catalytic paste according to claim 6, wherein said cellulosic ether is hydroxypropyl cellulose.

8. A catalytic paste according to claim 1 wherein the amount of said thickener is about 0.05 to about 0.6% of said paste.

9. A catalytic paste according to claim 1 which includes up to about 40% manganese dioxide.

10. An electrode comprising a porous conducting plaque filled with a catalytic paste comprising:
    1. about 3 to about 55% of a substantially elemental carbon material having an average particle size of less than about 25 microns;
    2. about 2 to about 10% of a hydrophobic binder;
    3. about 0.6 to about 4% of a catalyst;
    4. about 30 to about 70% water; and
    5. about 0.01 to about 3% of a non-ionic, water soluble thickener, said thickener being sufficiently resistant to alkali so that it does not form products which poison the electrolyte, and which, in a 2% solution, has a viscosity in excess of 100 centipoises, said thickener producing an improved polarization over a composition therewithout.

11. An electrode according to claim 10 wherein said plaque is nickel.

12. An electrode according to claim 11 wherein said plaque is composed of about 2 to about 100 layers of diffusion-bonded nickel fibers.

13. An electrode according to claim 12 wherein said plaque is about 2 to about 50 mils thick, said fibers are about ½ to about 5 mils thick, and the fibers in each layer are approximately unidirectional and at an angle of about 30° to 90° to the fibers in an adjacent layer.

14. An electrode according to claim 10 wherein one side of said plaque is covered with a porous, hydrophobic membrane.

15. An electrode according to claim 14 wherein said membrane is fibrillated polytetrafluoroethylene reinforced with fibrous polypropylene and is about 5 to about 40 mils thick.

16. An electrode according to claim 10 wherein said plaque has a porosity of about 70 to about 90%.

17. An electrode according to claim 10 wherein said paste is dehydrated and compacted.

18. An electrode according to claim 10 wherein said all-carbon material is activated carbon and said binder is polytetrafluoroethylene.

19. An electrode according to claim 10 wherein said thickener is cellulosic ether.

* * * * *